United States Patent [19]

Wojtanek

[11] Patent Number: 5,680,090
[45] Date of Patent: Oct. 21, 1997

[54] CAM OPERATED SWITCH WITH TEMPERATURE SENSOR AND SUBASSEMBLY THEREFOR

[75] Inventor: Guy A. Wojtanek, West Chicago, Ill.

[73] Assignee: Eaton Corporation

[21] Appl. No.: 321,703

[22] Filed: Oct. 12, 1994

[51] Int. Cl.[6] .......................... H01H 37/02; H01H 29/02
[52] U.S. Cl. ........................ 337/300; 337/298; 200/203
[58] Field of Search .................................. 337/2, 3, 102, 337/107, 298–305; 200/61.91, 61.88, 61.81, 185, 203; 236/DIG. 5

[56] References Cited

U.S. PATENT DOCUMENTS 5,099,092  3/1992  Lauritsen .................... 200/61.91

*Primary Examiner*—Leo P. Picard
*Assistant Examiner*—Jayprakash N. Gandhi
*Attorney, Agent, or Firm*—Roger A. Johnston

[57] ABSTRACT

A switch assembly of the type actuated by an external cam mechanism while immersed in a fluid such as transmission oil, the assembly includes an integral hollow probe with a thermistor for sensing the fluid temperature. The thermistor is assembled on an insert having an elongated support for insertion into the hollow probe. The insert also has electrical connector terminals to which the thermistor leads are connected to form a subassembly insertable in the switch housing and probe.

8 Claims, 3 Drawing Sheets

5,680,090

CAM OPERATED SWITCH WITH TEMPERATURE SENSOR AND SUBASSEMBLY THEREFOR

BACKGROUND OF THE INVENTION

The present invention relates to cam operated switches and particularly to such switches intended for immersion in fluids such as transmission oil and which include a temperature sensor for providing an electrical signal indicative of changes in temperature in the surrounding fluid. The invention particularly relates to switches of the type employed for indicating the position of a selector mechanism employed in an automotive power transmission to provide a signal indicating the position of the selector.

One known device of the type to which the present invention relates is that described in U.S. Pat. No. 5,099,092 issued to R. Lauritsen and assigned to the assignee of the present invention.

Heretofore, such devices have included a molded casing or housing in which the switching components are assembled and have included a hollow probe portion extending outwardly from the housing into which a thermistor is assembled and wired to connector terminals provided in the housing. In manufacturing such devices in high volume for passenger car automotive transmission applications, it has been found difficult and time consuming to assemble and connect the thermistor into the switch housing in a manner which provides reliable electrical connection and ease of assembly.

It has thus been desired to provide a way or means of improving the assembly and connection of a thermistor in the aforesaid type device in a manner which is economical and provides reliable electrical connection and provides the lowest manufacturing cost.

SUMMARY OF THE INVENTION

It is an object of the present invention to provide a simplified and reliable low-cost way of assembling a switch assembly of the type employed for cam actuation while immersed in fluid such as automotive power transmission fluid and having a thermistor which senses fluid temperature and provides a signal indicative thereof.

It is a further object of the present invention to provide a way and means of assembling and connecting a thermistor in a device of the aforesaid type in a manner which provides for reliable electrical connection thereto and minimizes assembly time and costs.

It is a further object of the present invention to provide a cam operated switch assembly having a thermistor for sensing temperature of the fluid into which the switch is immersed and having an insert sub-assembly for mounting and electrically connecting the thermistor leads to terminals prior to assembly into the switch housing.

The present invention provides a switch housing with switching mechanisms mounted in the housing and having a hollow probe portion opening into and extending therefrom. A separate insert has the thermistor support extending therefrom and connector terminals thereon with a thermistor wired in place thereon, thereby forming a sub-assembly for insertion into the switch housing.

DETAILED DESCRIPTION

Figure 1:
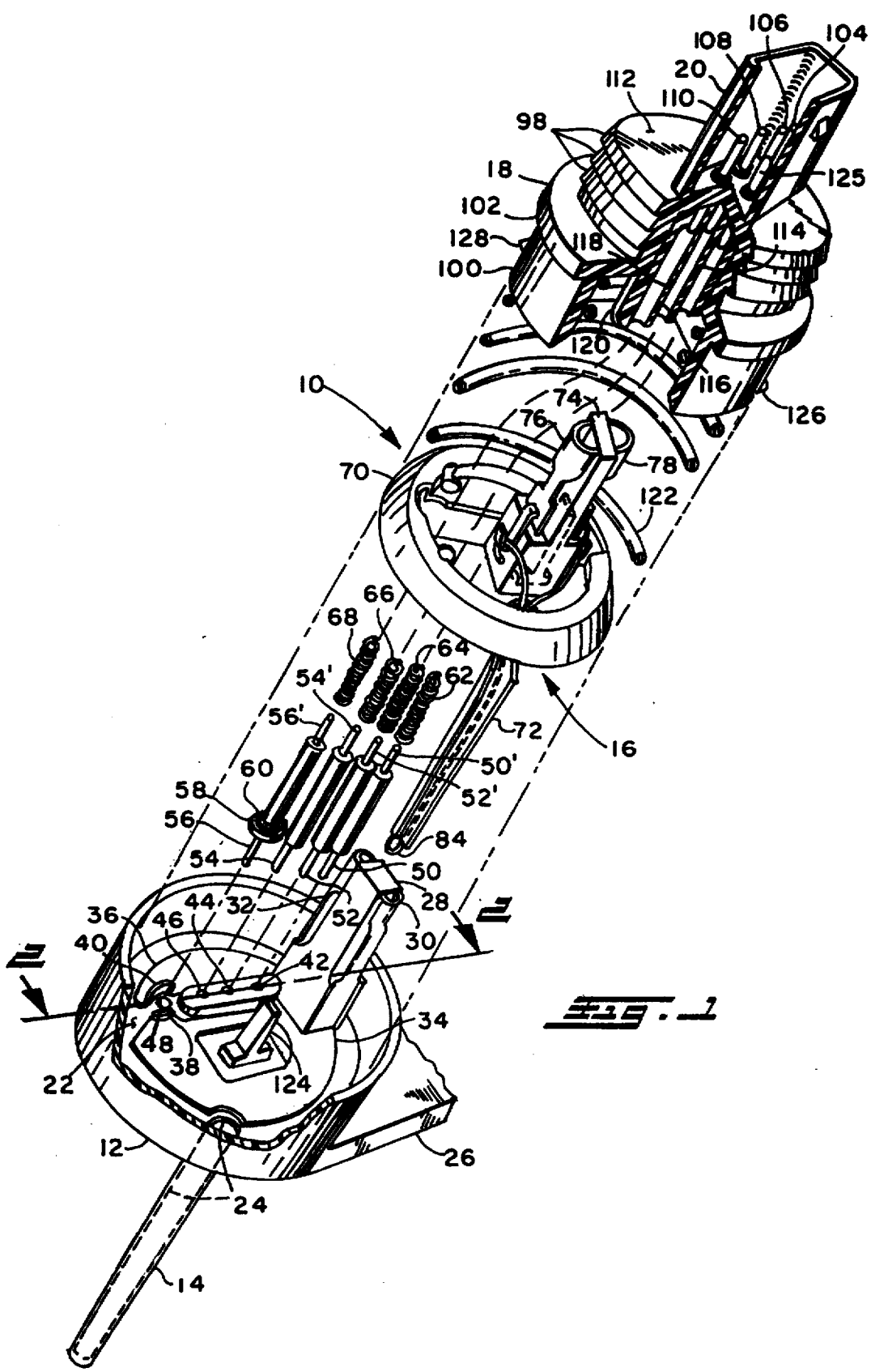
FIG. 1 is an exploded view of the switch assembly of the present invention showing the insert sub-assembly with the thermistor.

Referring to FIG. 1, the switch assembly of the present invention is indicated generally at 10 and includes a base or housing shell 12 which has a hollow probe portion 14 extending therefrom having preferably an elongated tapered configuration with the hollow opened to the interior of the shell 12. The switch assembly 10 includes an insert sub-assembly indicated generally at 16 and a cover shell 18 which includes a multi-pin electrical connector 20 extending outwardly therefrom for external electrical connection thereto.

The housing shell 12 has a generally cylindrical cup-shaped configuration with the base 22 of the cup shape having the probe 14 attached thereto and extending downwardly therefrom. Probe 14 has the interior hollow as illustrated by dashed lines in FIG. 1 and opening through base 22 as denoted by reference numeral 24. A mounting flange or tab 26 is formed preferably integrally with the housing 12 and extends therefrom for suitable anchorage in the mechanism, such as an automotive transmission, to which it is to be installed. A connector tower 28 extends upwardly from the base 22 and is preferably formed integrally therewith. The tower 28 has attached thereto on opposite sides thereof a pair of electrical connector socket terminals 30,32 which are of the type for receiving pin-type connectors therein. The connector terminals 30,32 are preferably each formed integrally with a contact plate denoted respectively 34,36 and which is registered against the bottom 22 of the cup-shaped housing. Plate 34 has formed therein and integrally therewith a contact rib or flange 38 which preferably has an arcuate configuration. Contact plate 36 has formed thereon a contact flange 40 which is preferably in an arcuate configuration and which is disposed in oppositely spaced arrangement with the contact portion 38 of plate 34.

The base 22 of the housing 12 has formed therethrough a plurality of spaced preferably aligned apertures denoted by reference numerals 42,44,46,48 with the aperture 48 being disposed between the contact portions 38,40. Each of the apertures 42,44,46,48 has slidably received therein a pin or plunger-type contact denoted respectively by reference numerals 50,52,54,56. Contact plunger 56 has received thereover a shorting washer 58 which is insulated from the pin 56 by an insulating washer 60 which is registered against an annular shoulder formed on pin 56. The contact washer 58 serves as a shorting bar to make electrical contact across the contact surfaces 40,38. It will be understood that each of the pins 50,52,54,56 extends downwardly through the respective aperture and extends from the underside of the housing 12. Each of the pins 50,52,54,56 has an enlarged diameter section formed intermediate the ends thereof and a reduced diameter portion denoted by reference numerals 50',52',54'56' formed on the upper end thereof over which is received respectively a compression spring as denoted by reference numerals 62,64,66,68.

The sub-assembly 16 includes an insert member 70 having a generally circular disc-like configuration with an elongated support member or projection 72 extending downwardly therefrom. The disc-like portion 70 has extending upwardly therefrom a tower portion 74 having mounted on opposite sides thereof a pair of electrical connecting terminals 76,78 each of which has a tab or lug denoted respectively 80,82 extending outwardly therefrom for wire lead attachment thereto. Terminals 76,78 are of the type configured to have received therein a pin-type connector.

Figure 4:
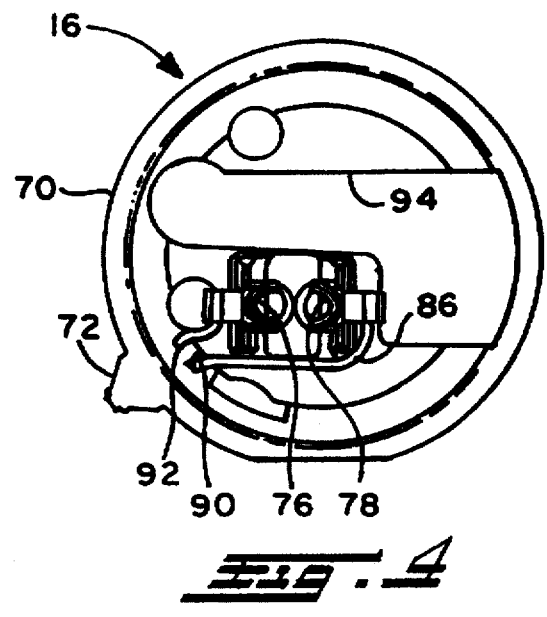
FIG. 4 is a top view of the sub-assembly of FIG. 3.
Figure 3:
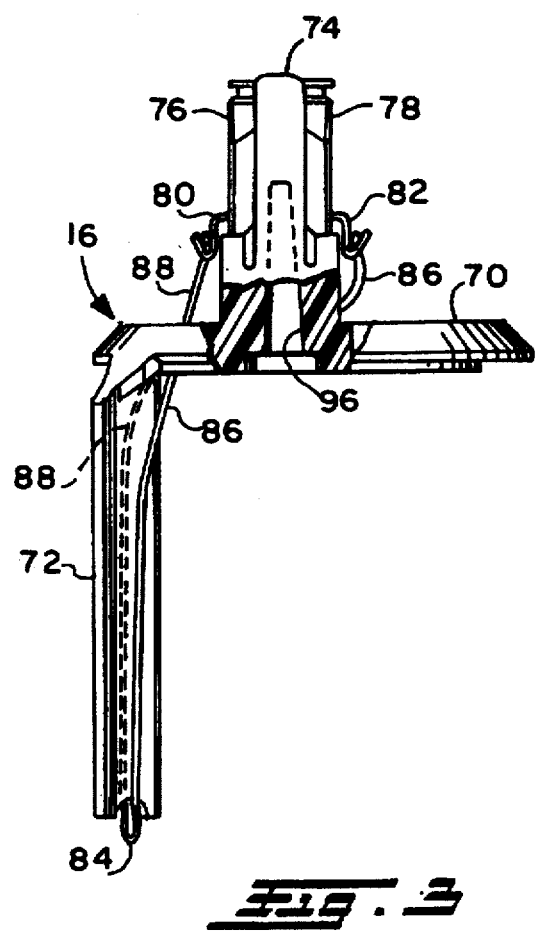
FIG. 3 is a side view of the thermistor insert sub-assembly of FIG. 1.

Referring to FIGS. 3 and 4, a thermistor 84 having a pair of leads 86,88 is mounted on the downwardly extending end of the projection 72; and, the leads 86,88 extend upwardly through cutouts 90,92 formed in the disc-like portion 70. The leads are respectively attached to the lugs 82,80. The lugs may be crimped or deformed over the leads 86,88. If desired, the lugs may be secured by weldment.

The disc-like portion of insert 70 has a central cutout 94 provided therein for clearance about the tower 28, the apertures 42,44,46 and the contacts 38,40 in the housing 22. The tower 74 has a hollowed out region 96 as shown in FIG. 3 formed from the underside thereof which forms guide or registration surfaces and which is preferably tapered for facilitating assembly.

Referring to FIG. 1, the cover 18 has a generally cylindrical configuration with a reduced diameter portion 112 which has resilient annular seals 98 provided therearound for sealing the cover in the structure in which it is to be mounted as, for example, through a port in the sidewall or housing of an automotive power transmission. The cover 18 has the outer or larger diameter 100 thereof sized and configured to closely interfit the cylindrical wall of housing 12; and, the diameter 100 has an annular shoulder 102 which upon assembly of the cover on housing shell 12 shoulder 102 registers against the rim of the housing 12.

The cover 18 has a plurality of terminal pins denoted respectively by reference numerals 104,106,108,110 secured through the deck portion 112 of the cover pins 104,106,108, 110 extend to the interior thereof into guide bores three of which are visible in FIG. 1 and are denoted respectively 114,116,118. The bores 114,116,118 extend downwardly through a guide portion 120 of the cover which extends downwardly from the underside of deck 112.

A coil spring 122 has its outer diameter sized to interfit the interior of cover 18 with its upper end registered against the undersurface of the end of the large diameter 100. The lower end coil of spring 122 is registered against the outer peripheral edge of the disc-shaped portion 70 of insert sub-assembly 16.

At assembly, the insert sub-assembly has the cutout 94 received over the tower 28 with the thermistor support 72 and thermistor extending downwardly into the hollow 24 of the probe 14. At assembly the guide surface 96 in tower 78 engages a correspondingly shaped and located guide lug 124 provided integrally with and extending upwardly from the deck 22 of the housing. It will be understood that the guide lug 124 registers and locates the tower 78 accurately within the housing 12.

The coil spring 122 is then assembled over the insert sub-assembly 16 and the cover is assembled over the insert tower 78 and the housing tower 28 such that a second row of terminal pins engages the connector terminals 26,28 in the insert tower and the terminals 32,30 in the housing tower. One of the second row of terminals is visible in FIG. 1 and is denoted by reference numeral 125.

As the cover is assembled over the insert sub-assembly 16, with the larger diameter portion 100 of the cover nesting in the cylindrical wall of housing 12. The springs 68,60,64 engage respectively the bores 118,116,114 in the cover and the upper end of the springs contacts the lower end of terminal pins 110,108,106,104 respectively to make electrical contact therewith. The cover is provided with snap locking lugs denoted by reference numerals 126,128 thereof which engage correspondingly located recesses provided in the wall of the housing on the interior thereof (not shown) for snap locking engagement to retain the cover on the housing 12. If desired, the lugs 126,128 may engage elongated slots to permit limited axial movement of the cover.

Figure 2:
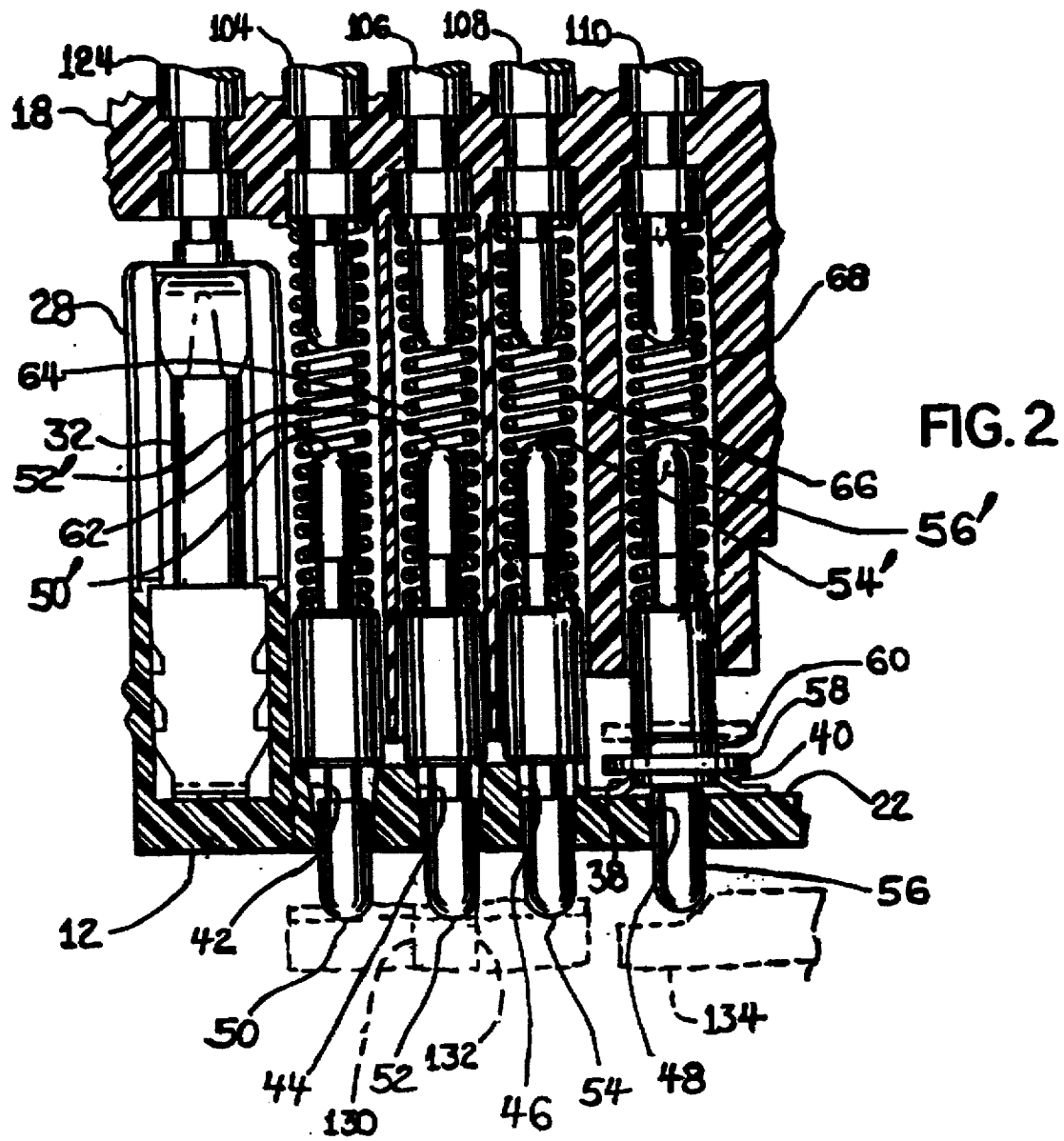
FIG. 2 is an enlarged portion of a section view taken along section indicating lines 2—2 of FIG. 2.

Referring to FIG. 2, the terminals in the cover are illustrated as engaging the springs and terminal pins in the housing as they appear in the assembled state. The cam surfaces which effect the electrical switching operations are shown in dashed outline in FIG. 2 and denoted by reference numerals 130,132,134. Cams 130 and 132 upon movement each as shorting bars between a pair of the pins 50, 52,54. Upon movement cam 134 lifts pin 56 to break contact between washer 58 and contacts 38,40.

The present invention thus provides a switch assembly of the type utilized with externally extending pins actuated by cam mechanisms and adapted for immersion in a fluid with a temperature sensing probe containing a thermistor for sensing the fluid temperature. The assembly of the present invention includes a novel thermistor sub-assembly which enables the thermistor to be assembled and wired on an insert. The thermistor is then inserted into the switch housing with the thermistor extending into a hollow probe formed integrally with the switch housing. The connector terminals and cover may then be readily assembled over the housing for completing the electrical connection with the switching mechanism in the housing and the thermistor sub-assembly.

Although the invention has been described herein with respect to the illustrated embodiments, it will be understood that the invention is capable of modification and variation and is limited only by the following claims.

We claim:

1. A thermistor insert sub-assembly for insertion as a unit into a switch/sensor assembly comprising:

(a) a carrier having a generally disc-shaped portion with a contact tower portion formed integrally on and extending from one side of said disc-shaped portion and an elongated support portion formed integrally with and extending from the side of said disc-shaped portion opposite said tower;

(b) a thermistor having a pair of electrical leads said thermistor received on said support portion with said leads extending therealong in spaced relationship and through said disc-shaped portion to said one side thereof; and, (c) terminal means disposed on said tower portion with said thermistor leads secured thereto.

2. The sub-assembly defined in claim 1, wherein said terminal means includes lug means is deformed over said leads.

3. The sub-assembly defined in claim 1, wherein said terminal means is press-fitted onto said tower portion.

4. The sub-assembly defined in claim 1, wherein said terminal means is secured to said lead means by weldment.

5. The sub-assembly defined in claim 1, wherein said terminal means comprises a pair of terminals with one of said thermistor leads connected to each of said terminals.

6. A switch for operation by a cam and temperature sensor assembly comprising:

(a) housing means formed of electrically insulating material and defining a switching cavity and an elongated hollow probe portion with the hollow thereof communicating with said cavity;

(b) switching means disposed in said cavity and having a plurality of actuators extending externally of said housing means for operation by a cam;

(c) an insert sub-assembly including a carrier member having a thermistor with a pair of leads disposed on said carrier with terminal means on said carrier connected to the leads of the thermistor, said insert sub-assembly inserted as a unit in said housing means with said carrier disposed in said switching cavity and with said thermistor extending into said probe hollow;

(d) cover means including a plurality of external electrical connector terminals, said cover means disposed for limited movement with respect to said housing and closing said cavity, with certain of said external connector terminals connecting with said thermistor terminal means and others of said external connector means connecting with said switching means; and, (e) spring means having one reaction end urging said cover means in one direction of said limited movement and the opposite reaction end urging said carrier in registration with said housing means.

7. The assembly defined in claim 6, wherein said carrier includes a plate portion having a thickness small relative to the surface dimensions thereof, an elongated thermistor support portion and a tower portion for supporting said terminal means with said portions integrally formed of electrically non-conductive material.

8. The assembly defined in claim 6, wherein said terminal means are pressfitted onto said carrier means.

* * * * *